United States Patent [19]

Hosono et al.

[11] Patent Number: 5,134,021

[45] Date of Patent: Jul. 28, 1992

[54] ANTI-FOGGING FILM

[75] Inventors: Hiroshi Hosono, Otsu; Takashi Taniguchi, Yasu, both of Japan

[73] Assignee: Toray Industries, Inc., Tokyo, Japan

[21] Appl. No.: 467,353

[22] Filed: Jan. 23, 1990

Related U.S. Application Data

[63] Continuation-in-part of Ser. No. 460,789, Jan. 4, 1990, abandoned.

[51] Int. Cl.$^5$ .................. C09K 3/18; B32B 27/30; B32B 5/16
[52] U.S. Cl. ...................... 428/213; 106/13; 523/169; 524/493; 524/557; 428/270; 428/331; 428/334; 428/336; 428/428; 428/446; 428/447; 428/448; 428/451
[58] Field of Search ............. 428/142, 216, 331, 334, 428/336, 446, 447, 451, 420, 429, 213, 220; 523/169; 106/13, 287.1, 287.15, 287.16; 525/56, 58, 100, 342; 528/29, 32; 524/557, 493

[56] References Cited

U.S. PATENT DOCUMENTS

| | | | |
|---|---|---|---|
| 3,773,776 | 11/1973 | Iler | 524/493 |
| 4,016,129 | 4/1977 | Miyosawa | 524/557 |
| 4,026,826 | 5/1977 | Yoshida et al. | 106/287.15 |
| 4,127,682 | 11/1978 | Laurin | 427/164 |
| 4,170,690 | 10/1979 | Armbruster et al. | 428/447 |
| 4,478,909 | 10/1984 | Taniguchi et al. | 428/331 |
| 4,876,146 | 10/1989 | Isaka et al. | 428/347 |

FOREIGN PATENT DOCUMENTS 0123927  11/1984  European Pat. Off.
58-101164  6/1983  Japan .................. 106/13

OTHER PUBLICATIONS

WPIL, File Supplier, No. 87-111632, Derwent Publications Ltd., London, GB; & JP-A-62 056 338 (Toray Ind. Inc.) Dec. 3, 1987.
WPIL, File Supplier, No. 87-230689, Derwent Publications Ltd., London, GB; & JP-A-62 153 147 (Toray Ind., Inc.) Aug. 7, 1987.

*Primary Examiner*—George F. Lesmes
*Assistant Examiner*—Christopher Brown
*Attorney, Agent, or Firm*—Armstrong, Nikaido, Marmelstein, Kubovcik & Murray

[57] ABSTRACT

Disclosed is an anti-fogging film having a multilayer structure comprised of at least two layers of a cured film formed on a substrate. The cured film contains as main components (A) polyvinyl alcohol and (B) at least one member selected from (a) colloidal silica having an average particle size of 5 to 200 mμ, (b) an organic silicon compound of the formula $R^1R^2_aSiX_{3-a}$ in which $R^1$ is an organic group having 1 to 10 carbon atoms, $R^2$ is a hydrocarbon group having 1 to 6 carbon atoms, X is a hydrolyzable group and a is 0 or 1, and (c) a hydrolysis product of an organic silicon compound of the formula $R^1R^2SiX_{3-a}$ in which $R^1$, $R^2$, X and a are as defined above, wherein the ratio $S_2/S_1$ of the weight ratio $S_2$ of component (A) to component (B) in the layer contiguous to the topmost surface layer to the weight ratio $S_1$ of component (A) to component (B) in the topmost surface layer is at least 1.05.

7 Claims, No Drawings ively used for window panes, window glasses
ANTI-FOGGING FILM This application is a continuation-in-part of application Ser. No. 460,789 filed Jan. 4, 1990, now abandoned.

BACKGROUND OF THE INVENTION

1. Field of the Invention

The present invention relates to an anti-fogging film having a good durability.

The anti-fogging film of the present invention is advantageously used for window panes, window glasses of airplanes, and front and rear window and window shield glasses of automobiles.

2. Description of the Related Art

Plastic materials and inorganic glasses are widely used as various articles such as window panes, mirrors, eyeglass lenses and goggles, while retaining a transparency, but, when these materials are placed under high-temperature and high-humidity conditions or at interfacial boundaries where the differences of the temperature and humidity are large, the surface is fogged or often scratched.

Accordingly, attempts to impart an anti-fogging property and durability to these articles have been proposed.

For example, U.S. Pat. No. 4,127,682 proposes the use of polyvinyl alcohol for imparting an anti-fogging property and durability.

It is known that polyvinyl alcohol is crosslinked with finely divided silica to give a water-resistant coating (U.S. Pat. No. 3,773,776).

Furthermore, a curable coating composition comprising a polyvinyl alcohol/silica complex as the main component has been proposed (U.S. Pat. No. 4,016,129).

Moreover, U.S. Pat. No. 4,478,909 proposes an anti-fogging film having an improved durability, and having a multilayer structure composed of polyvinyl alcohol, finely divided silica and an organic silicon compound and/or a hydrolysis product thereof, wherein the content of silica in a lower layer is larger than that in the topmost surface layer.

PROBLEM TO BE SOLVED BY THE INVENTION

However, the anti-fogging film disclosed in U.S. Pat. No. 4,127,682 has only a temporary anti-fogging property and a low hardness.

The techniques of U.S. Pat. No. 3,773,776 and U.S. Pat. No. 4,016,129 proposed for eliminating the foregoing disadvantages fail to provide a satisfactory anti-fogging film material because the hydrophilic property of polyvinyl alcohol is drastically lowered.

The technique of U.S. Pat. No. 4,478,909 provides an anti-fogging film in which the defects of the above-mentioned conventional techniques are considerably overcome to a great extent, but this anti-fogging film has a low hardness. Accordingly, an anti-fogging film having an improved surface hardness is desired in the fields of window panes, and window glasses of airplanes and automobiles.

SUMMARY OF THE INVENTION

The present invention is intended to overcome these defects of the conventional techniques, and the primary object thereof is to provide a film having a durable anti-fogging property and a high surface hardness.

In accordance with the present invention, there is provided an anti-fogging film having a multilayer structure comprising at least two layers of a cured film formed on a substrate, said cured film comprising as main components (A) polyvinyl alcohol and (B) at least one member selected from the group consisting of (a) colloidal silica having an average particle size of 5 to 200 m$\mu$, (b) an organic silicon compound represented by the general formula $R^1R^2_aSiX_{3-a}$ in which $R^1$ represents an organic group having 1 to 10 carbon atoms, $R^2$ represents a hydrocarbon group having 1 to 6 carbon atoms, X represents a hydrolyzable group and a is 0 or 1, and (c) a hydrolysis product of an organic silicon compound represented by the general formula $R^1R^2_aSiX_{3-a}$ in which $R^1$, $R^2$, X and a are as defined above, wherein the ratio $S_2/S_1$ of the weight ratio $S_2$ of the component (A) to the component (B) in the layer contiguous to the topmost surface layer to the weight ratio $S_1$ of the component (A) to the component (B) in the topmost surface layer is at least 1.05.

DESCRIPTION OF THE PREFERRED EMBODIMENTS

The polyvinyl alcohol used as the component (A) is a partial or complete saponification product of a polyvinyl ester such as polyvinyl acetate, and polyvinyl alcohol having an average polymerization degree of 250 to 3,000 and a saponification value of at least 70% by mole is preferably used in the present invention. If the average polymerization degree is lower than 250, the durability, especially the water resistance, is lowered. If the average polymerization degree is higher than 3,000, the coating composition formed by using this polyvinyl alcohol has too high a viscosity, and thus it is difficult to obtain a smooth coating film. If the saponification value is lower than 70% by mole, a satisfactory anti-fogging effect cannot be obtained.

As a typical example of the colloidal silica having an average particle size of 5 to 200 m$\mu$ as the component (B), there can be mentioned silica sol. The term silica sol means a colloidal dispersion of high-molecular-weight silicic anhydride in water and/or an organic solvent such as an alcohol. To obtain the object of the present invention, colloidal silica having an average particle size of 5 to 200 m$\mu$ is used, and colloidal silica having an average particle size of about 7 to about 50 m$\mu$ is especially preferable. If the average particle size is smaller than 5 m$\mu$, the stability of the dispersion is poor and it is difficult to obtain a product having constant properties. If the average particle size is larger than 200 m$\mu$, the formed coating film has a poor transparency and only an opaque product is obtained. The particle size herein referred to is a value measured by JEM-1200 supplied by JEOL, and the average particle size is the mean value of particle sizes of at least 100 primary particles.

The organic silicon compound represented by the general formula $R^1R^2 SiX_{3-a}$ as another component (B) is a component valuable for improving the water resistance, the adhesion to a substrate and the surface hardness. In the above-mentioned general formula, $R^1$ represents an organic group having 1 to 10 carbon atoms. For example, there can be mentioned an alkyl group, an aryl group and an alkenyl group, and these organic groups having an substituent such as an epoxy group, a methacryloyloxy group, an acryloyloxy group or a halogen atom. $R^2$ represents a hydrocarbon group having 1 to 6 carbon atoms, such as an alkyl group, an aryl group or an alkenyl group. X represents a hydrolyzable group. For example, there can be mentioned an alkoxy group such as a methoxy group or an ethoxy group, an acyloxy group such as an acetoxy group, a halogen atom such as chlorine or bromine, and an aryloxy group such as a phenoxy group. Namely, any hydrolyzable functional groups can be used as X, without limitation. In the formula, a is 0 or 1.

As specific examples of the organic silicon compound, there can be mentioned β-glycidoxyethyltrimethoxysilane, γ-glycidoxypropyltrimethoxysilane, γ-glycidoxypropyltriethoxysilane, β-glycidoxypropyltrimethoxysilane, β-glycidoxyethylmethyldimethoxysilane, β-glycidoxyethylmethyldiethoxysilane, γ-glycidoxypropylmethyldimethoxysilane, γ-glycidoxypropylmethyldiethoxysilane, β-glycidoxyethylethyldimethoxysilane, γ-glycidoxypropylethyldimethoxysilane, γ-glycidoxypropylethyldiethoxysilane, β-glycidoxypropylethyldiethoxysilane, β-glycidoxyethylpropyldimethoxysilane, β(3,4-epoxycyclohexyl)ethyltrimethoxysilane, β-(3,4-epoxycyclohexyl)ethyltriethoxysilane, methyltrimethoxysilane, methyltriethoxysilane, vinyltrimethoxysilane, vinyltriethoxysilane, vinyltriacetoxysilane, vinyltrimethoxyethoxysilane, γ-chloropropyltrimethoxysilane, γ-chloropropyltriethoxysilane, γ-chloropropyltripropoxysilane, β-chloropropyltributoxysilane, phenyltrimethoxysilane, phenyltriethoxysilane, 3,3,3-trifluoropropyltrimethoxysilane, γ-methacryloxypropyltrimethoxysilane, dimethyldimethoxysilane, γ-chloropropylmethyldimethoxysilane, and γ-methacryloxypropylmethyldimethoxysilane. These compounds can be used alone or in the form of a mixture of two or more thereof.

The organic silicon compound as the component (B) can be used as it is, or the organic silicon compound is first hydrolyzed and the hydrolysis product then used. The hydrolysis can be performed by customary methods using an inorganic acid such as hydrochloric acid, an organic acid such as an acetic acid or an alkali such as caustic soda, or using water alone.

In the present invention, at least one member selected from the group consisting of the above-mentioned colloidal silica, the above-mentioned organic silicon compound and the hydrolysis product thereof. To improve the surface hardness and anti-fogging property and provide a good balance therebetween, a combined use of colloidal silica with an organic silicon compound represented by the general formula $R^1R^2 SiX_{3-a}$ and/or a hydrolysis product thereof is especially preferable.

The film of the present invention has a multilayer structure comprising at least two layers of a cured film comprising the above-mentioned components (A) and (B) as the main components, and the topmost surface layer (hereinafter referred to as "first layer") of the multilayer structure and the layer (hereinafter referred to as "second layer") contiguous to the topmost surface layer must have the following relationship. Namely, the ratio $S_2/S_1$ of the (A)/(B) weight ratio $S_2$ of the component (A) to the component (B) in the second layer to the (A)/(B) weight ratio $S_1$ of the component (A) to the component (B) in the first layer must be at least 1.05. If this S ratio is lower than 1.05, the surface hardness is reduced and a formation of the multilayer structure is not realized. To particularly improve the surface hardness, the $S_2/S_1$ ratio is preferably at least 2.00 and more preferably at least 5.00.

The topmost surface layer is the outermost layer having contact with outer air, and represents the portion that can be distinguished from the lower layer by the composition thereof.

The mixing ratio of the components (A) and (B) in the multilayer film should be determined according to the required anti-fogging property, surface hardness and water resistance and other characteristics. When the resulting product is used under severe conditions, for example, for window panes, window glasses of airplanes and automobile wind shield glasses, preferably the component (B) is used in an amount of 5 to 2,000 parts by weight per 100 parts by weight of the component (A). From the viewpoint of the surface hardness, the component (B) is preferably contained int he first layer in an amount of 100 to 2,000 parts by weight and, more preferably, 100 to 1,000 parts by weight, per 100 parts by weight of the component (A), and in the second layer, the component (B) is contained in an amount of 5 to 150 parts by weight per 100 parts by weight of the component (A), with the proviso that the requirement that the $S_2/S_1$ ratio is at least 1.05 must be satisfied. If the amount of the component (B) is smaller than the lower limit in the composition ratio of the components (A) and (B) in each layer, a reduction of the surface hardness and reduction of the water resistance often occur. If the amount of the component (B) exceeds the upper limit, the anti-fogging property is lowered.

Where the multilayer film of the present invention comprises at least three layers, a lower layer is further formed below the second layer. The composition of the lower layer is not particularly critical, so far as the layer comprises the components (A) and (B) as the main components, and it is sufficient if the lower layer has a satisfactory interfacial adhesion to the substrate or the layer formed above the lower layer.

In the cured film of the present invention, each layer comprises the components (A) and (B) as the main components. This means that, in each layer, the sum of the contents of the components (A) and (B) is at least 50% by weight.

The substrate used in the present invention can be subjected to an activating gas treatment, a physical treatment such as sand blasting or a chemical treatment with an acid, a base or an oxidant, or can be coated with a primer, to improve the adhesion to the film.

The film thickness of the first layer is preferably 0.001 to 5 μm. If the film thickness of the first layer is smaller than 0.001 μm, the surface hardness is lowered, and if the film thickness of the first layer is larger than 5 μm, the anti-fogging property is reduced.

In view of the anti-fogging property and surface uniformity, preferably the film thickness of the second layer is 2 to 100 μm. The film thickness of the lower layer formed below the second layer is not particularly critical.

In addition to the above-mentioned indispensable components, a solvent, an additive, and a modifier can be incorporated into the film-forming composition used in the present invention.

For example, water, various alcohols, ketones, esters, ethers, cyclic ethers, dimethylformamide, dimethylsulfoxide and dimethylimidazolidinone can be used as the solvent.

Various surface active agents can be used as the additive for improving the surface smoothness. For example, there can be used a silicone compound, a fluorine-containing surface active agent, and another organic surface active agent.

An organic polymer having a good compatibility with the composition of the present invention can be used as the modifier. For example, there can be mentioned hydroxyethylcellulose, polyhydroxyethyl acrylate or polyhydroxyethyl methacrylate, or a copolymer thereof, an alcohol-soluble nylon, polyacrylamide, and polyvinyl pyrrolidone or a copolymer thereof. Furthermore, a tetrafunctional silane compound such as ethyl silicate, n-propyl silicate, i-propyl silicate, n-butyl silicate, i-butyl silicate or t-butyl silicate can be added. Moreover, an epoxy resin, a melamine resin, an amide resin or the like can be added.

To promote the curing, a catalyst known as the catalyst for the condensation of a silanol and/or the reaction of a silanol with a hydroxyl group can be used, if necessary. For example, an aluminum chelate compound represented by the formula $Al \cdot X_n \cdot Y_{3-n}$ in which X represents a lower alkoxy group, Y is a legand derived from a compound selected from the group consisting of $M^1COCH_2COM^2$ and $M^3COCH_2COOM^4$ where $M^1$, $M^2$, $M^3$ and $M^4$ represent a lower alkyl group, and n is 0, 1 or 2, is preferably used.

Various aluminum chelate compounds can be used. As preferable examples in view of the catalyst activity, the solubility in the composition, and the stability, there can be mentioned aluminum acetylacetonate, aluminum ethylacetoacetate bisacetylacetonate, aluminum bisethylacetoacetate acetylacetonate, aluminum di-n-butoxide monoethylacetoacetate, and aluminum di-i-propoxide monomethylacetoacetate. These compounds can be used alone or in the form of a mixture of two or more thereof.

The additives other than the indispensable components can improve various practical characteristics such as heat resistance, weatherability, water resistance, adhesion and chemical resistance of the film formed from the anti-fogging composition of the present invention, according to the intended use to which the present invention is applied.

In the present invention, the cured film can be colored by adding a dye or pigment in at least one of the first and second layers, so long as the transparency is not reduced.

To improve the slip characteristics of the outermost surface of the film of the present invention, a covering film is formed on the outermost surface or a surface treatment of the molecule order can be performed, so long as the anti-fogging property of the film of the present invention is not substantially reduced. If a covering film is formed, the thickness of the covering film is preferably up to 0.1 μm. For example, a silicone resin, especially dimethylpolysiloxane, is preferably used as the covering film-forming material. A curable silicone resin that can be cured at room temperature by removal of an alcohol or acetic acid is especially preferable. A silane coupling agent is preferably used as the material to be used for the surface treatment. As the silane coupling agent, there can be mentioned trimethylsilyl group-containing compounds such as trimethylmethoxysilane, trimethylethoxysilane, trimethylchlorosilane and hexamethylsilazane, and dimethyldimethoxysilane, dimethyldiethoxysilane, and dimethyldichlorosilane. The surface treatment can be performed by various methods, such as a solution treatment method comprising immersing the film of the present invention in a solution of a silane coupling agent as mentioned above, and a gas-phase treatment method comprising placing the film of the present invention in a vapor of a silane coupling agent as mentioned above.

The cured film-forming composition can be obtained, for example, by a method in which the respective components are morely mixed together or a method in which a certain component is subjected to a certain treatment such as hydrolysis and the treated component is mixed with other components. These methods can be effectively adopted for forming the composition of the present invention.

As a specific example of the process for preparing the film having a multilayer structure according to the present invention, there can be mentioned the following process.

A lower layer-forming composition is coated and a surface layer-forming composition is coated thereon by the twice-coating method.

In this case, after coating and curing of the lower layer-forming composition, a surface treatment can be carried out according to need, and the surface layer-forming composition then can be coated and cured. Furthermore, a method can be adopted in which the lower layer-forming composition is coated, after a certain setting of the coated composition, the surface layer-forming composition is coated thereon in the wet-on-wet manner, and coatings having different compositions are cured at one time. The cured film is generally formed at a temperature of 50° to 250° C. At too low a temperature, the curing is insufficient, and at too high a temperature, a discoloration or deterioration of the film often occurs.

The film having a multilayer structure according to the present invention has a good anti-fogging property.

To enhance the anti-fogging property, after the coating of the first layer-forming composition, the wet treatment can be carried out before or after the curing.

By the wet treatment referred to herein is meant a treatment in which the film is immersed in water or an organic solvent, or is allowed to stand in a high-humidity atmosphere. The film can be heated at this treatment according to need.

A similar effect can be attained if a rubbing treatment comprising rubbing the surface of the film with a soft article such as a fabric represented by gauze or nonwoven fabric or a paper, or an article softened by wetting with water or the like is carried out instead of the above-mentioned wet treatment.

The anti-fogging film of the present invention can be applied to various substrates, and the kind of substrate is not particularly critical, so long as the characteristics of the film of the present invention are not reduced. Nevertheless, the characteristics are especially prominently manifested when the present invention is applied to plastics, inorganic glasses, transparent ceramics, metals, and mirrors. Furthermore, high practical values can be obtained when the present invention is applied to inorganic glass lenses, window panes of bath rooms and the like, and windows of automobiles and trains.

The coating composition of the present invention can be coated on a substrate article by various known methods, such as brush coating, dip coating, spin coating, flow coating, spray coating, roll coating, and curtain flow coating.

The present invention will now be described in detail with reference to the following examples.

EXAMPLE 1

(1) Preparation of Coating Composition

(a) Preparation of Hydrolysis Product of γ-glycidoxypropyltrimethoxysilane

A beaker was charged with 236 g of γ-glycidoxypropyltrimethoxysilane, and 54 g of a 0.01N aqueous solution of hydrochloric acid was gradually added while stirring and maintaining the liquid temperature at 10° C. After completion of the dropwise addition, cooling was stopped to obtain a hydrolysis product of γ-glycidoxypropyltrimethoxysilane.

(b) Preparation of Aqueous Solution of Polyvinyl Alcohol (PVA)

A beaker was charged with 850 g of distilled water, and 150 g of PVA (having a saponification value of 91 through 94 and a polymerization degree lower than 1,000; catalogue values) was added to distilled water using a spoon for stirring. The mixture was stirred for 60 minutes while warmed by a warm water bath maintained at 90° C. to form a solution. The formed solution was cooled to room temperature to obtain an aqueous solution of PVA.

(c) Preparation of Second Layer-Forming Coating Composition

To 500 g of the aqueous solution of PVA prepared in (b) above were gradually added 20.9 g of the hydrolyzed silane prepared in (a) above, 210 g of methanol-silica sol having a solid content of 30% and an average particle size of 13 mμ as measured by JEM-1200 supplied by JEOL and 6 g of distilled water with stirring. Then, 210 g of 1,4-dioxane, 0.5 g of a fluorine-containing surface active agent and 3.0 g of aluminum acetylacetonate were added to the above mixture while stirring. The resulting mixture was stirred for 1 hour to obtain a second layer-forming coating composition. The $S_2$ value, i.e., the weight ratio of PVA to the sum of the hydrolyzed silane (solids) and the silica sol (solids), was 1.000.

(d) Preparation of First Layer-Forming Coating Composition

To 276 g of the aqueous solution of PVA prepared in (b) above were gradually added 208 g of the hydrolyzed silane prepared in (a) above, 322 g of methanol-silica sol having a solid content of 30% and an average particle size of 13 mμ as measured by JEM-1200 supplied by JEOL and 168 g of distilled water while stirring. Then, 210 g of 1,4-dioxane, 0.5 g of a fluorine-containing surface active agent and 3.0 g of aluminum acetylacetonate were added, while stirring, to the mixture, and the resulting mixture was stirred for 1 hour to form a first layer-forming coating composition. The $S_1$ value, i.e., the weight ratio of PVA to the sum of the hydrolyzed silane (solids) and the silica sol (solids), was 0.192.

(e) Formation of Primer

To 7 g of the hydrolyzed silane prepared in (a) above were added 396 g of n-propyl alcohol and 396 g of methyl alcohol, and the mixture was stirred to form a primer.

(2) Preparation of Substrate

A float glass sheet having a size of 3 mm × 100 mm × 100 mm was degreased, washed with a neutral detergent, rinsed with water, and then dried. The float glass sheet was immersed in the primer and coated with the primer according to the dip method (20 cm/min). Then the coated glass sheet was dried for 30 minutes by a hot air drier maintained at 110° C., to obtain a substrate.

(3) Formation (Coating) of Anti-Fogging Film

The substrate prepared in (2) above was coated with the second layer-forming coating composition prepared in (1)-(c) above by the dip method at a rate of 10 cm/min and dried for 60 minutes by a hot air drier maintained at 80° C. The coated substrate was cooled to room temperature and coated with the first layer-forming coating composition prepared in (1)-(d) above by the dip method at a rate of 5 cm/min. The coated substrate was heated at 80° C. for 10 minutes and at 120° C. for 2 hours to effect the curing. Furthermore, to enhance the anti-fogging property, the coated substrate was immersed in hot water maintained at 90° C. to effect the wet treatment. Then the coated substrate was dried to obtain an anti-fogging film having a multi-layer structure.

(4) Evaluation

The anti-fogging film obtained in (3) above had a good transparency, and the total luminous transmittance was 93%.

One hundred square cuts having a side of 1 mm, which reached the substrate, were formed on the surface of the coating by using a steel knife, and an adhesive cellophane tape (Celotape supplied by Nichiban) was strongly bonded to the surface of the coating and was peeled at a high speed at an angle of 90°. When peeling of the coating was checked, it was found that none of square cuts of the coating was peeled, and it was confirmed that the coating film had a good adhesion.

The Taber abrasion test (JIS R-3212) was carried out as the hardness test. After the test of 100 revolutions, the haze gain value was 3.8%.

At the anti-fogging test, the coating film was breathed on, but the film was not fogged.

Comparative Example 1

The procedures of Example 1 were repeated in the same manner except that the surface layer mentioned in (1)-(d) was not formed. The anti-fogging property was good, but at the Taber abrasion test, the haze gain value was 18.0% and good results were not obtained.

EXAMPLES 2 through 5

The procedures of Example 1 were repeated in the same manner except that the coating compositions for the first and second layers were changed as shown in Table 1. The obtained coating films were evaluated in the same manner as described in Example 1. The results are shown in Table 1.

TABLE 1

| | Second Layer-Forming Composition | | | | | | | First Layer-Forming Composition | | | | | | | Results of Evaluation | | |
|---|---|---|---|---|---|---|---|---|---|---|---|---|---|---|---|---|---|
| | A | B | C | D | E | F | $S_2$ | A | B | C | D | E | F | $S_1$ | Adhesion | Taber Abrasion Test | Anti-Fogging Property |
| Example 2 | 500 | 20.8 | 210 | 3 | 210 | 55.7 | 1.000 | 115 | 17.3 | 326 | 2.5 | 216 | 322 | 0.160 | Good | 1.8 | Good |
| Example 3 | 520 | 52 | 0 | 3 | 210 | 93 | 2.604 | 230 | 17.3 | 268 | 2.5 | 216 | 264 | 0.383 | Good | 2.1 | Good |
| Example 4 | 900 | 20.8 | 10 | 3 | 66 | 0 | 9.009 | 115 | 17.3 | 326 | 2.5 | 216 | 322 | 0.160 | Good | 1.7 | Good |
| Example 5 | 900 | 20.8 | 10 | 3 | 66 | 0 | 9.009 | 231 | 56.2 | 193 | 2.5 | 216 | 300 | 0.385 | Good | 4.1 | Good |

Note
A: aqueous solution of PVA
B: hydrolyzed γ-glycidoxypropyltrimethoxy-silane
C: methanol-silica sol
D: aluminum acetylacetonate
E: 1,4-dioxane
F: water Each unit of the amounts of the components A through F is "parts by weight".

The value of $S_1$ and $S_2$ in Examples 1 through 5 were calculated on the assumption that the solids content in the hydrolyzed silane is 57.6%.

The anti-fogging film provided according to the present invention has the following advantages.

(1) The anti-fogging film has an excellent anti-fogging property and this anti-fogging property is durable.
(2) The surface hardness is high.
(3) The weatherability is excellent.
(4) A substrate can be covered at a low cost.

We claim:

1. An anti-fogging film having a multilayer structure comprising at least two layers of a cured film formed on a substrate, said cured film comprising as main components (A) polyvinyl alcohol and (B) at least one member selected from the group consisting of (a) colloidal silica having an average particle size of 5 to 200 mμ, (b) an organic silicon compound represented by the general formula $R^1R^2 SiX_{3-a}$ in which $R^1$ represents an organic group having 1 to 10 carbon atoms, $R^2$ represents a hydrocarbon group having 1 to 6 carbon atoms, X represents a hydrolyzable group and a is 0 or 1, and (c) a hydrolysis product of an organic silicon compound represented by the general formula $R^1R^2 SiX_{3-a}$ in which $R^1$, $R^2$, X and a are as defined above, wherein the ratio $S_2/S_1$ of the weight ratio $S_2$ of the component (A) to the component (B) in the layer contiguous to the topmost surface layer to the weight ratio $S_1$ of the component (A) to the component (B) in the topmost surface layer is at least 1.05.

2. An anti-fogging film as set forth in claim 1, wherein the polyvinyl alcohol has an average polymerization degree of 250 to 3,000 and a saponification value of at least 70% by mole.

3. An anti-fogging film as set forth in claim 1, wherein in the topmost surface layer, the component contained in an amount of 100 to 2,000 parts by weight per 100 parts by weight of the component (A).

4. An anti-fogging film as set forth in claim 1, wherein in the layer contiguous to the topmost surface layer, the component (B) is contained in an amount of 5 to 150 parts by weight per 100 parts by weight of the component (A).

5. An anti-fogging film as set forth in claim 1, wherein the thickness of the topmost surface layer is 0.001 to 5 μm.

6. An anti-fogging film as set forth in claim 1, wherein the thickness of the layer contiguous to the topmost surface layer is 2 to 100 μm.

7. An anti-fogging film as set forth in claim 1, wherein the ratio $S_2/S_1$ is at least 2.00.

* * * * *